Patented May 19, 1942

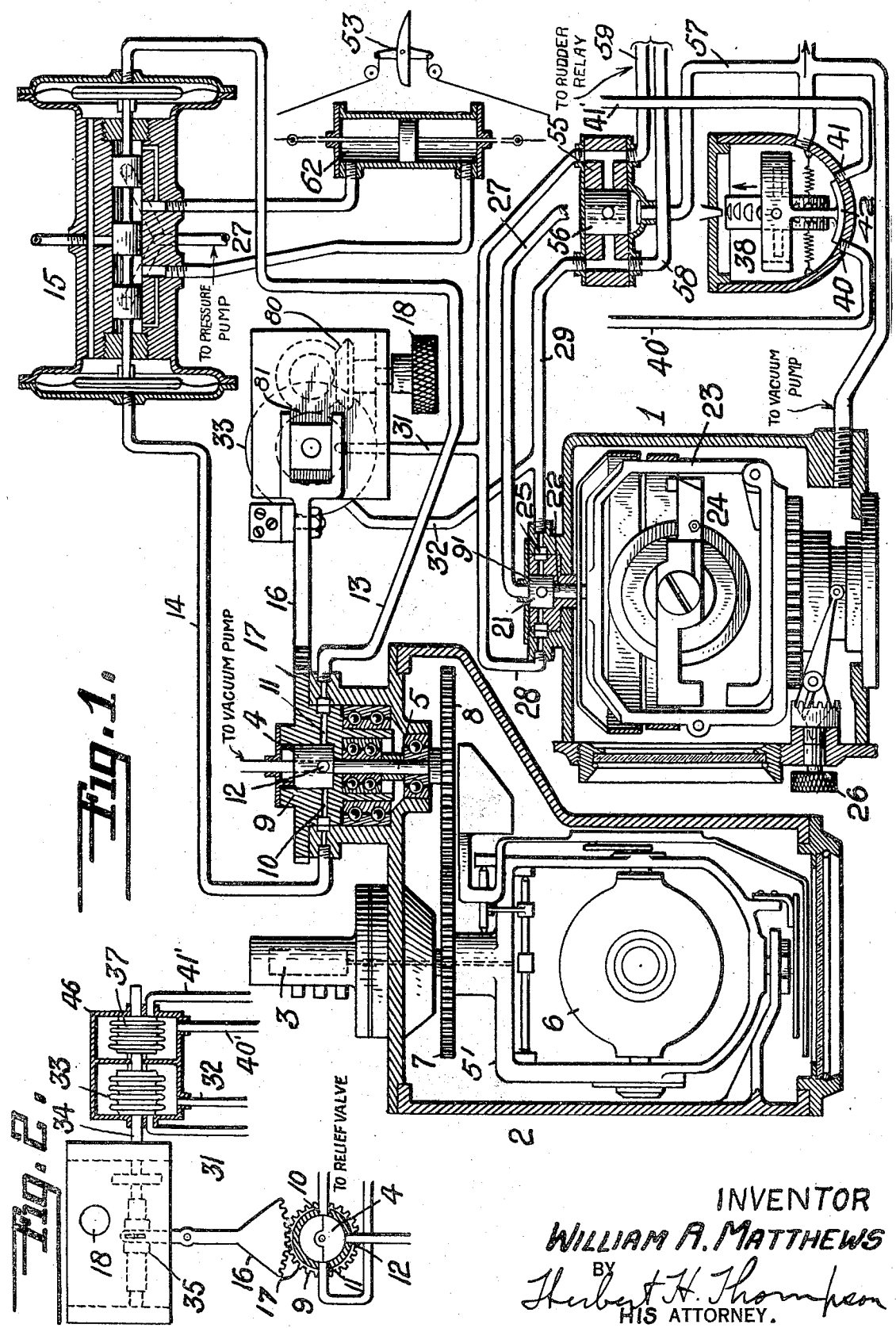

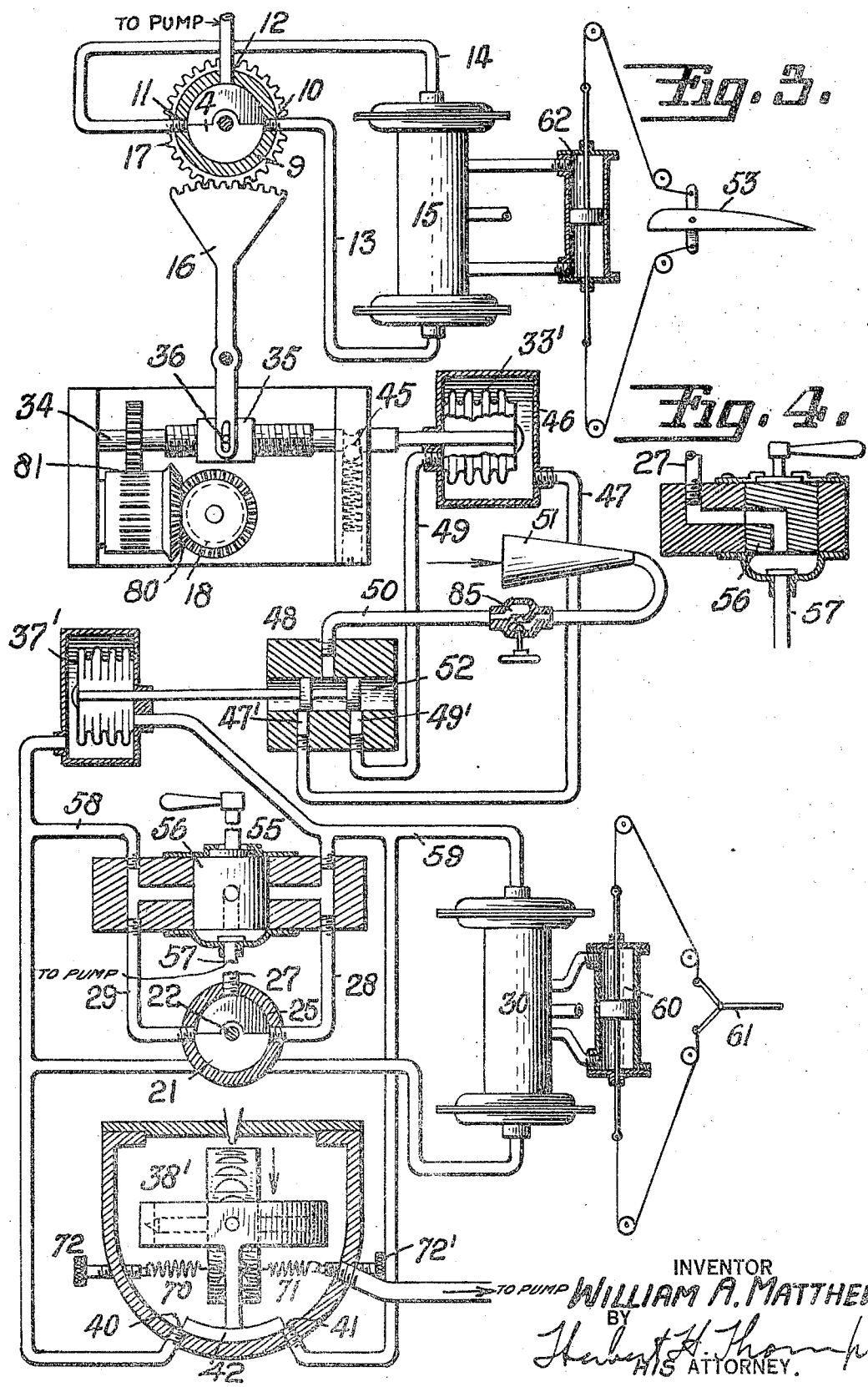

2,283,754

UNITED STATES PATENT OFFICE 2,283,754

AUTOMATIC BANKING MEANS FOR AIRPLANE GYRO PILOTS

William A. Matthews, Brooklyn, N. Y., assignor to Sperry Gyroscope Company, Inc., Brooklyn, N. Y., a corporation of New York Application April 8, 1939, Serial No. 266,767

12 Claims. (Cl. 244—79)

This invention relates to automatic pilots for aircraft, especially to means for automatically banking the craft at the correct angle during a turn of the craft. While several devices have been previously proposed for this general purpose, the majority of the prior devices either do not bank the craft at the proper angle or do not cause the bank at the proper time, so that in either event considerable side slipping occurs.

According to my invention, I propose to bring about a displacement of the ailerons from the same signal that causes a turn of the rudder, thereby bringing about a bank of the craft at the same time that the turn starts, and a displacement of the ailerons initially proportional to the amount the rudder is turned. The proper banking angle is primarily responsive to the rate of turn, and therefore I determine the final banking angle largely from the rate of turn of the craft. While this is satisfactory for a constant air speed, for accurate results I prefer to also vary the banking angle with the air speed of the craft as well as the rate of turn.

Another improvement effected by my invention relates to means for causing a quick turn of the craft for rapid maneuvering, with proper banking at all times.

Other advantages and improvements will become apparent from the accompanying description.

Referring to the drawings, showing several forms my invention may assume,

Fig. 1 is a diagrammatic view, partly in section, of the principal portions of an automatic pilot with my banking attachment applied thereto.

Fig. 2 is a side elevation of the portion of Fig. 1 which controls the automatic bank.

Fig. 3 is a simplified diagram of a similar system, omitting, however, the directional and artificial horizon gyroscopes, but showing a modification of the invention.

Fig. 4 is a sectional detail of the manual control valve taken in a plane perpendicular to the paper in Figs. 1 and 3.

The type of pilot to which this invention is shown applied is of the general form shown in the patent to Sperry, Bates and Carlson, #1,992,970, dated March 5, 1935, in which a directional gyroscope 1 is employed for controlling the steering in azimuth and a horizon gyroscope or gyro-vertical 2 is employed for controlling the pitch and bank angles of the craft. Since the invention does not concern the pitch axis, all mechanism beyond the pick-off 3 for this axis is omitted in Fig. 1. The pick-off controlling the banking is shown as comprising a semi-circular disc 4 mounted on a shaft 5 which is turned from the gimbal ring 5' of the gyroscope proper 6 through intermeshing gears 7 and 8. Said disc is mounted in a cylindrical chamber 9 having pick-off ports 10 and 11 on opposite sides of its walls, and into which air under positive or negative pressure is introduced through a central port 12. It will readily be apparent that if the semicircular disc is rotated relatively to the chambered member 9, the ports will be differentially covered and uncovered, thus resulting in a variation in the pressure supplied to the two connected pipes 13 and 14 leading to opposite ends of the relay valve 15 controlling servo motor 62 for the ailerons 53.

The member 9 is also rotatably mounted in order to trim the craft or bank the same, its position being shown as governed by gear sector 16, which meshes with teeth 17 on the exterior of member 9. A banking knob 18 is shown for manually adjusting the banking angle, if and when desired, through bevel gears 80 and pinions 81. The position of the gear sector 16 is also controlled from one or more servo devices such as Sylphons or expansible containers 33 and 37 which are responsive to a signalled turn and/or to turn of the craft.

For governing the course of the craft, I show a similar semicircular pick-off disc 21 secured to the vertical shaft 22 rising from the vertical ring 23 of the directional gyro proper 24. Said disc is surrounded by a chambered member 25 similar to housing 9. In the ordinary design, said housing may be rotatable to change course, although this is not necessary, as course changes may be effected through the setting knob 26 at the base of the gyroscope, by which the gyroscope may be set at any desired position and thus any desired course steered, such setting knob being well known in the art. The differential effective air pressure or signal received from this type of pick-off, as is well known in the art, is, within a small angle (on the order of 5°), proportional to the angle of deviation of the craft from its normal course or, in other words, within these limits the signal strength is proportional to deviation, and therefore the resulting rudder movement will be proportional to deviation.

The chamber 25 around valve 21 is shown as supplied through a pipe 27 which is connected to a vacuum pump, while the pick-off ports thereon are connected to pipes 28 and 29 leading directly or indirectly to the rudder relay valve, not shown in Fig. 1, but appearing at 30 in Fig. 3. Tapped into pipes 28 and 29 are shown pipes 31 and 32, the former leading into one of the bellows 33 connected to one end of a threaded shaft 34 and the other leading into the enclosure for said bellows. Said shaft has a nut 35 threaded thereon which is connected to the gear sector 16 through a pin and slot connection 36 (see Fig. 3). Rotation of the shaft 34 from the knob 18 will therefore serve to accurately adjust the ported housing 9, or for causing banking, alone, if desired, while axial movement of the shaft 34 also shifts the position of the housing 9, this axial shift being effected in part from the Sylphon 33. Thus, as soon as a course change is set in on the gyro, the signal therefrom not only effects a turning of the rudder, but also a deflection of the ailerons which is proportional to the signal strength and, therefore, proportional to the amount the rudder has been turned, which in turn controls the rate of turn of the craft. The ports 10 and 11 are normally centralized by a spring pressed ball 45 (Fig. 3) which normally engages an annular depression in the shaft 34, so that the ports are normally held in their central position and are only displaced therefrom when a turn is made.

Preferably, in addition to the Sylphon 33 I employ a second Sylphon 37 which is controlled from a rate of turn gyroscope 38 of conventional form. To this end, the rate gyroscope is shown as provided with differential pick-off ports 40 and 41, differentially covered by a plate 42 on the turn gyroscope, to which ports are connected pipes 40' and 41', respectively. Therefore the Sylphon 37 will receive a signal proportional to the rate of turn of the craft, but the initiation of bank does not wait for an actual turn to start, but is caused by the Sylphon 33 as soon as the signal to turn is transmitted. The rate of turn gyroscope control therefore supplements the bank control from the directional gyro in that while it is slower in its initial action, it assures the correct banking angle being maintained regardless of the amount that the craft is deviating from course, i. e., beyond limit that proportional control is maintained from the directional gyro pick-off.

As mentioned hereinbefore, if it is desired to introduce exactly the correct banking angle for different air speeds, the air speed must be taken into account as well as the angular rate of turn. The apparatus shown in Fig. 1, however, may be designed to give exactly the correct banking angle for any predetermined air speed, so that for ordinary transport flying it is unnecessary to introduce a correction for air speed, since each ship usually has a definite cruising speed.

Fig. 3 shows one method of introducing the correction for changes of air speed and also shows at the same time a simplified method of taking care of the rate of turn factor. In this figure, the banking pick-off of the horizon gyroscope is marked with the same reference characters as in Fig. 1, but only a single bellows 33' is shown for shifting the pick-off for introducing the bank. In this case the bellows 33' is enclosed in a container 46, the interior of which is connected to a pipe 47 leading to one port 47' in slide valve 48. The interior of the bellows is connected through a pipe 49 to a port 49' in the same valve, the central supply port 50 of which is connected to some means supplying air pressure proportional to air speed, such as a wind funnel 51. When the piston valve 52 is in its central position, no air is supplied to either pipe 47 or 49, but when said valve is moved to the right in Fig. 3, air pressure is supplied to the interior of the bellows through pipe 49, thus rotating sector 16 counter-clockwise, while the reverse takes place when the valve is moved to the left in Fig. 3. The amount the ported member 9 is displaced will be approximately proportional to air speed. Needle valve 85 smooths out sudden pressure changes in pipe 50.

The position of the valve 52 is controlled by a second metallic bellows or Sylphon 37', which may be connected as before to the pick-offs 40 and 41 on the rate gyroscope 38'. In this case, however, I have shown the directional gyroscope pick-off as connected to the same bellows 37' instead of to an independent bellows, both turn gyroscope and directional gyroscope being also connected together to the rudder relay valve 30 controlling the servo motor 60 for rudder 61. The rudder therefore is jointly controlled from the directional gyroscope and the rate of turn gyroscope, and the rate gyroscope in this instance operates principally as an antihunt and rate of turn limiting device, as disclosed in the copending application of T. W. Kenyon and S. J. Zand, for Reactive servo system for automatic pilots, now Patent No. 2,210,917, dated August 13, 1940, at all times operating to oppose turning of the craft. In this figure, therefore, the signal from the rate gyroscope is in the reverse direction from that in Fig. 1, which is represented in the drawings by showing the rotors as spun in opposite directions in the two instances.

In this type of steering device, the ship always turns at the same rate, namely, the rate of turn determined by the turn gyroscope 38', (which rate, however, may be adjusted by adjusting the tension of the centralizing springs 70 and 71 through set screws 72 and 72') so that separate Sylphons are not needed and it is unnecessary to introduce additional apparatus to take care of variable rates of turn. On the other hand, the variations in air speed are taken care of through the variations in pressure supplied to the Sylphon 33' with variations in air speed.

For purposes of quick maneuvering, I have shown in both forms of the invention an auxiliary three-way valve 55 placed in the main vacuum supply pipe 27 leading to the directional gyroscope pick-off (see Figs. 1, 3 and 4). When the cylinder valve 56 is in the position shown in Figs. 1 and 3, the vacuum supply at 57 is connected through the valve to pipe 27 and the direction gyro pick-off. When, however, the valve is thrown to the left in Fig. 4, the vacuum is connected directly to the pipe 58 leading to the rudder relay valve 30, while when it is thrown in the other direction, the vacuum supply is connected to the pipe 59 leading to the opposite end of said valve 30. Thus, a direct control is secured to the rudder servomotor 60 for turning the craft regardless of the weaker signals from the directional gyroscope. At the same time, automatic banking will also be secured since the Sylphons 33' and 37' and their enclosing chambers are connected to the pipes 58 and 59 at all times.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an automatic pilot for aircraft, direction maintaining means, an air-flow pick-off thereat for controlling the rudder, an attitude maintaining device, a pick-off thereat for controlling the ailerons to maintain lateral stability, and means responsive to a turn signal from said first named pick-off device for displacing the pick-off on said attitude device to cause a banked turn.

2. An automatic pilot as claimed in claim 1, having an auxiliary rate-of-turn gyroscope and means responsive thereto also for shifting the pick-off device on said attitude maintaining device for maintaining the banking angle proportional to rate of turn.

3. In an automatic pilot for aircraft, an attitude maintaining means, a pick-off thereat for governing the ailerons to maintain level flight, a rate-of-turn gyroscope, and means responsive thereto for shifting said pick-off at said attitude maintaining device proportionally to the rate of turn for automatic banking.

4. In an automatic pilot for aircraft having both direction maintaining means and a rate gyroscope for governing the rudder position, whereby the rate of turn of the craft is substantially constant, means for banking the craft in one direction or the other, dependent on the direction of turn, and means responsive to the air speed of the craft for adjusting the degree of bank.

5. An automatic pilot as claimed in claim 1, having means responsive to air speed of the craft, and means controlled thereby for varying the degree of bank in accordance with the air speed.

6. In an automatic pilot for aircraft, an attitude maintaining means and pick-off thereat for governing the ailerons to maintain level flight, a manually operable course changing device, a valve thereon for turning the rudder, and means responsive to a turn signal received from said valve for shifting said pick-off in one direction or the other according to the sign and proportionally to the strength of said signal.

7. In an automatic pilot, an attitude maintaining means, pick-off thereat for governing the ailerons to maintain level flight, normally inoperative means for shifting said pick-off an amount proportional to air speed, and means respon to initiation of the turn in either direction for causing said first named means to shift said pick-off in one direction or the other, dependent upon the direction of turn, and through an angle which varies with air speed.

8. In an automatic pilot for aircraft, position maintaining means, an air-flow pick-off thereat for controlling the rudder, an attitude maintaining device, a pick-off thereat for controlling the ailerons to maintain lateral stability, a rate of turn gyroscope, and means jointly responsive to turn signal from both said first named pick-off and said rate gyroscope for displacing the attitude pick-off to cause a correctly banked turn.

9. An automatic pilot for aircraft as claimed in claim 3, having means responsive to the air speed of the craft and means controlled thereby for also varying the degree of bank in accordance with the air speed.

10. In a servo system for airplane control, the combination with a fluid pressure rudder servomotor and a fluid pressure aileron servomotor, manually operable means for differentially controlling the fluid pressure controlling the first named motor, and automatic means responsive to the differential pressure so created for also causing the proportional operation of said second motor, whereby automatic banking is caused at an angle varying with the pressure exerted on the rudder.

11. In an automatic pilot for aircraft of the air-flow pick-off type, a direction maintaining device having an air-flow pick-off, a source of air pressure normally connected thereto, a reversible servomotor controlled therefrom and adapted to be driven in one direction or the other as the heading of the craft deviates from the position normally maintained by said device, and a manually operable multiple position valve in the connections between said pick-off and said source and between said pick-off and said servomotor adapted to connect the latter directly to said source of air pressure in one direction in one position and in the other direction in the other position, whereby temporary changes of course may be caused without reference to said direction maintaining device.

12. In an automatic pilot for aircraft, direction maintaining means, a proportional air flow pick-off thereat for positioning the rudder substantially proportional to the deviation of the craft from the normal heading maintained by said direction maintaining means, an attitude maintaining device, a proportional pick-off thereat for controlling the ailerons substantially proportional to the inclination of the craft with respect to said device, and pressure responsive means operated from the pressure differential from the first named pick-off and connected to displace the pick-off on said attitude device, whereby banking is obtained proportional to the rudder displacement.

WILLIAM A. MATTHEWS.